United States Patent
Voith et al.

(10) Patent No.: US 10,688,688 B2
(45) Date of Patent: Jun. 23, 2020

(54) METHOD AND DEVICE FOR PRODUCING A THERMOPLASTIC GRANULATE MATERIAL

(71) Applicant: IPCO Germany GmbH, Fellbach (DE)

(72) Inventors: Bernhard Voith, Ottenbach (DE); Frank Maué, Zweibruecken (DE)

(73) Assignee: IPCO Germany GmbH, Fellbach (DE)

( * ) Notice: Subject to any disclaimer, the term of this patent is extended or adjusted under 35 U.S.C. 154(b) by 345 days.

(21) Appl. No.: 15/542,961

(22) PCT Filed: Jan. 15, 2016

(86) PCT No.: PCT/EP2016/000066
§ 371 (c)(1),
(2) Date: Oct. 16, 2017

(87) PCT Pub. No.: WO2016/113137
PCT Pub. Date: Jul. 21, 2016

(65) Prior Publication Data
US 2019/0030757 A1      Jan. 31, 2019

(30) Foreign Application Priority Data

Jan. 16, 2015    (DE) ..................... 10 2015 000 262

(51) Int. Cl.
*B29B 9/04*        (2006.01)
*B29B 7/74*        (2006.01)
(Continued)

(52) U.S. Cl.
CPC .............. *B29B 9/04* (2013.01); *B29B 7/7461* (2013.01); *B29B 7/82* (2013.01); *B29B 7/90* (2013.01);
(Continued)

(58) Field of Classification Search
CPC ............ B29B 9/04; B29B 7/7461; B29B 7/10
(Continued)

(56) References Cited

U.S. PATENT DOCUMENTS 2,755,509 A * 7/1956 Smidth ..................... B29B 9/04
241/3
4,056,592 A     11/1977 Izumi et al.
(Continued)

FOREIGN PATENT DOCUMENTS

CA      1 316 321 C     4/1993
CN       1400088 A      3/2003
(Continued)

OTHER PUBLICATIONS

English Translation of EP2858801 (Year: 2015).*
(Continued)

*Primary Examiner* — Matthew J Daniels
*Assistant Examiner* — Hana C Page
(74) *Attorney, Agent, or Firm* — Collard & Roe, P.C.

(57) ABSTRACT

In the production of thermoplastic granulate material, after mixing the starting materials, it is common in the state of the art for these materials to be kneaded and compressed in extruders, with subsequent granulation. According to the invention, no extruder is used, rather the starting materials for the thermoplastic granulate material are supplied directly to a double belt press after the mixing. Subsequently, the generated web-type to sheet-type body is processed into a granulate material by means of grinding, or is used as a web-type, sheet-type, strip-type or film-type intermediate product for the production of a further intermediate product or end products.

12 Claims, 5 Drawing Sheets

(51) Int. Cl.
  *B29B 7/82* (2006.01)
  *B29B 7/90* (2006.01)
  *B29B 7/10* (2006.01)
  *B30B 5/06* (2006.01)
  *B29K 27/06* (2006.01)

(52) U.S. Cl.
  CPC .................. *B30B 5/06* (2013.01); *B29B 7/10* (2013.01); *B29K 2027/06* (2013.01)

(58) Field of Classification Search
  USPC ........................................................ 264/140
  See application file for complete search history.

(56) References Cited

U.S. PATENT DOCUMENTS

| | | | |
|---|---|---|---|
| 4,923,658 | A | 5/1990 | Hover et al. |
| 5,145,626 | A | 9/1992 | Bastioli et al. |
| 5,460,764 | A | 10/1995 | Held |
| 6,217,700 | B1 | 4/2001 | Knobel |
| 6,838,030 | B2 | 1/2005 | Hashimoto et al. |
| 7,077,640 | B2 | 7/2006 | Hashimoto et al. |
| 7,513,967 | B2 * | 4/2009 | Kato ..................... B27N 3/002 156/80 |
| 2010/0300609 | A1* | 12/2010 | Caldas ................ C08L 23/0876 156/244.11 |

FOREIGN PATENT DOCUMENTS

| | | |
|---|---|---|
| CN | 101102874 A | 1/2008 |
| DE | 1 679 865 A1 | 3/1971 |
| DE | 1 956 241 A1 | 10/1971 |
| DE | 74 19 997 U | 12/1975 |
| DE | 25 30 904 A1 | 2/1976 |
| DE | 69 43 436 U | 2/1976 |
| DE | 25 59 177 A1 | 7/1977 |
| DE | 77 03 279 U1 | 2/1978 |
| DE | 35 46 215 A1 | 7/1987 |
| DE | 36 04 888 A1 | 8/1987 |
| EP | 0 235 794 A2 | 9/1987 |
| EP | 0 483 780 A2 | 5/1992 |
| EP | 0 544 645 A2 | 6/1993 |
| EP | 1 045 751 B1 | 2/2003 |
| GB | 2 190 916 A | 12/1987 |
| GB | 2190916 * | 11/1989 |
| JP | 2008 284729 A | 11/2008 |
| WO | 98/21272 A2 | 5/1998 |
| WO | 2006/072638 A1 | 7/2006 |
| WO | 2013/071327 A2 | 5/2013 |

OTHER PUBLICATIONS

English Translation of JP2008284729 (Year: 2008).*
English Translation of JP7164464 (Year: 1993).*
International Search Report of PCT/EP2016/000066, dated May 18, 2016.

* cited by examiner

Detail X

METHOD AND DEVICE FOR PRODUCING A THERMOPLASTIC GRANULATE MATERIAL

CROSS REFERENCE TO RELATED APPLICATIONS

This application is the National Stage of PCT/EP2016/000066 filed on Jan. 15, 2016, which claims priority under 35 U.S.C. § 119 of German Application No. 10 2015 000 262.7 filed on Jan. 16, 2015, the disclosure of which is incorporated by reference. The international application under PCT article 21(2) was not published in English.

BACKGROUND OF THE INVENTION

1. Field of the Invention

The invention relates to a method of making a thermoplastic granulate material, wherein the starting materials are initially mixed to yield a pourable powder mixture within a heating/cooling mixer, subsequently a dimensionally stable body is generated from the powder mixture and thereafter from the dimensionally stable body the thermoplastic granulate material is produced by comminuting.

2. Description of the Related Art

From the prior art it is known that for the making of a thermoplastic granulate material initially the starting materials, such as thermoplastic plastic powder, additives, plasticizers, pigments, lubricants, filler materials, additives etc. are well mixed within a first mixer, a heated mixer, while applying heat, and are mixed together, wherein the heating is generated by means of the mechanical energy of the stirring during stirring/mixing. Thereafter the mixture generated within the first mixer is transferred into a second mixer, being connected to the heated mixer, namely a so-called cooling mixer, and stirring is continued so that the temperature of the mixture is kept below the softening temperature thereof, so that the mixture reaches environmental temperature, and a pourable powdered mixture is generated as an intermediate substrate.

Heating/cooling mixers have been known since many decades and are technically well developed, since the oldest German patent in this regard was already filed in 1977. These heating/cooling mixers, inter alia may be equipped with double walls or with cooling/heating coils for possibly regulating or controlling the inner temperature thereof, e.g. by a liquid medium, so that the powdered mixture processed therein from the starting ingredients materials always has an optimum process temperature.

From the prior art it is further known that such mixtures—as described above, namely pourable powder mixtures—from the heating/cooling mixer(s) are transferred into an extruder (in this regard see DE 1 679 865, second column, lines 5 to 15) for generating a dimensionally stable body, an intermediate product. From this intermediate product, the dimensionally stable body, thereafter the thermoplastic granulate material is made; to this end after the extruder(s) a granulator, a comminutor, is provided. The granulate material obtained in this way is then fed to a storage, is stored therein in various containers as mono-fractioned material, for retrieving the latter for a further production process, if needed—usually for making a final product. Storing a mono-fractioned material is to be understood so that the produced thermoplastic granulate materials are stored sorted at least by their color and/or granulate size and/or granulate shape.

From these intermediate granulates of different kinds, different shapes and/or different colors that are usually stored and prepared by means of extruders subsequently or in parallel in several installations, then in a further processing facility/production facility a desired thermoplastic final product, e.g. a two-dimensional product of granite-like multi-colored structure can/will be produced. A typical thermoplastic final product is a thermoplastic strip-type material which is produced within a double belt press (such as e.g. within a Thermofix press). Such a production process and such a double-belt press (Thermofix press) in the literature are known in many cases and thus are part of the prior art; e.g. they are known from EP 1 045 751 B1.

Within the frame of the present application a thermoplastic web is understood as a belt-shaped body comprising at least thermoplastic material particles which during the manufacturing process have been thermally fixed with each other and—as far as present—together with additives. The additives usually are in the form of granulates, fiber-shaped or rod-shaped or plate-shaped or sphere-shaped or prismatic material particles or in the shape of mesh-works; the additives may also be partially in liquid form.

Since often with the web-shaped final products, the thermoplastic webs which usually are formed to covering products, in particular floorings, plastic tiles and similar products or cladding elements, a spotted or speckled or structured appearance is desired, during the manufacture of the thermoplastic web within a double-belt press it is important that the thermoplastic material particles (granulates) dispersed onto the (conveyor) belt, which is usually revolving during the manufacturing process, are only surface-fused and densified and are affected as little as possible with respect to their horizontal positions, but by no means are mixed with adjacent particles. Such mixings cannot be prevented with other known techniques for producing thermoplastic webs, such as calendering, rolling or wide-slot extruding, due to the nature of the process.

SUMMARY OF THE INVENTION

If no thermoplastic material particles/granulate materials of different shape or different color, respectively, would be utilized or thermoplastic material particles/granulate materials that are intermixed too much, then within the produced thermoplastic web only a mixed shade of color but not the dotted or speckled appearance or the structured pattern, respectively, would result.

Since according to the prior art the production of the granulate materials extruders are utilized, a high energy input is necessary, and in addition, the extruders also are subject to a high wear which lead to an increase in the production costs and thus in the total cost of the produced final product.

In addition also the use of particular starting materials, in particular of filler materials with abrasive characteristics, the production of the thermoplastic granulate materials may be rendered unprofitable, since the extruders are subject to an increased wear. In addition with the utilization of filler materials with abrasive characteristics it is detrimental that it is necessary to feed the extruders in a gentle way free of decompositions which again lead to an increase in processing time and require a more complex feeding apparatus; thus in the very end the costs of manufacture for the final product are increased.

In view of the prior art mentioned above and in view of the drawbacks thereof it is the object of the invention to optimize the manufacture of the thermoplastic granulate material, in particular to lower the production costs. A further object is the improvement of the thermoplastic material with respect to its characteristics and/or its diversity with respect to the color design which positively influences the final products mentioned at the outset.

According to the invention the object is achieved by a method of producing a thermoplastic granulate material according to one aspect of the invention as well as by an installation for manufacturing a thermoplastic granulate material according to another aspect of the invention. Further embodiments of the method according to the invention and further embodiments of the installation according to the invention are discussed below.

With the new method of producing thermoplastic granulate materials according to the invention the utilization of one or more extruders is totally dispensed with. The production of a dimensionally stable body from which the thermoplastic granulate material is obtained by comminuting according to the invention is performed using a facility for producing a final product, primarily by using a facility for producing a thermoplastic web, in particular using a double-belt press, more particular using a so-called Thermofix installation (Thermofix press). The advantage of the method according to the invention rests on the one hand in the fact that high production costs which would result from the utilization of extruders, are avoided and, on the other hand, in that within a double-belt press for manufacture of a thermoplastic web the said dimensionally stable body, i.e. the starting body for the generation of the thermoplastic granulate material by comminuting, can be obtained with considerably more variations with respect to the color and to its characteristics when compared to the known methods.

In particular according to the invention it is provided that the pourable thermoplastic intermediate substrate that is generated within a first process part by means of a heating/cooling mixer, the powdery mixture within a double-belt press (Thermofix press) is initially formed to a dimensionally stable body, namely a web-shaped intermediate product of a particular type.

The term "particular type" within the scope of this invention means that the web-shaped intermediate product—seen in cross-section—is monochromatic or in its horizontal or its vertical extension comprises several color layers that are distinct from each other. The transition from one color layer to an adjacent colored layer may be abrupt, or the transition between two adjacent color layers may be gradual.

The web-shaped intermediate product then in a special comminutor is comminuted to a thermoplastic granulate material of a defined outer shape. The comminutor or comminutors are cutting devices, choppers, mills, or similar devices.

BRIEF DESCRIPTION OF THE DRAWINGS

Further details, features and advantages of the invention will be pointed out in the subsequent description and, in addition, in connection with the embodiments of the inventions described in the description and schematically represented. In the drawings show.

Initially it should be mentioned that terms such as "left", "right", "top" or "bottom" only relate to the representation within the drawings, but in the actual embodiment it may deviate in practice. In addition it should be mentioned that the drawings do not represent technical drawings, this being the reason why hatchings and fault lines partially are not present. Also the relative dimensions may deviate in practice. Reference numerals that are not mentioned in the description can be taken from the reference list. The references have the same meanings in all figures.

Figure 1:
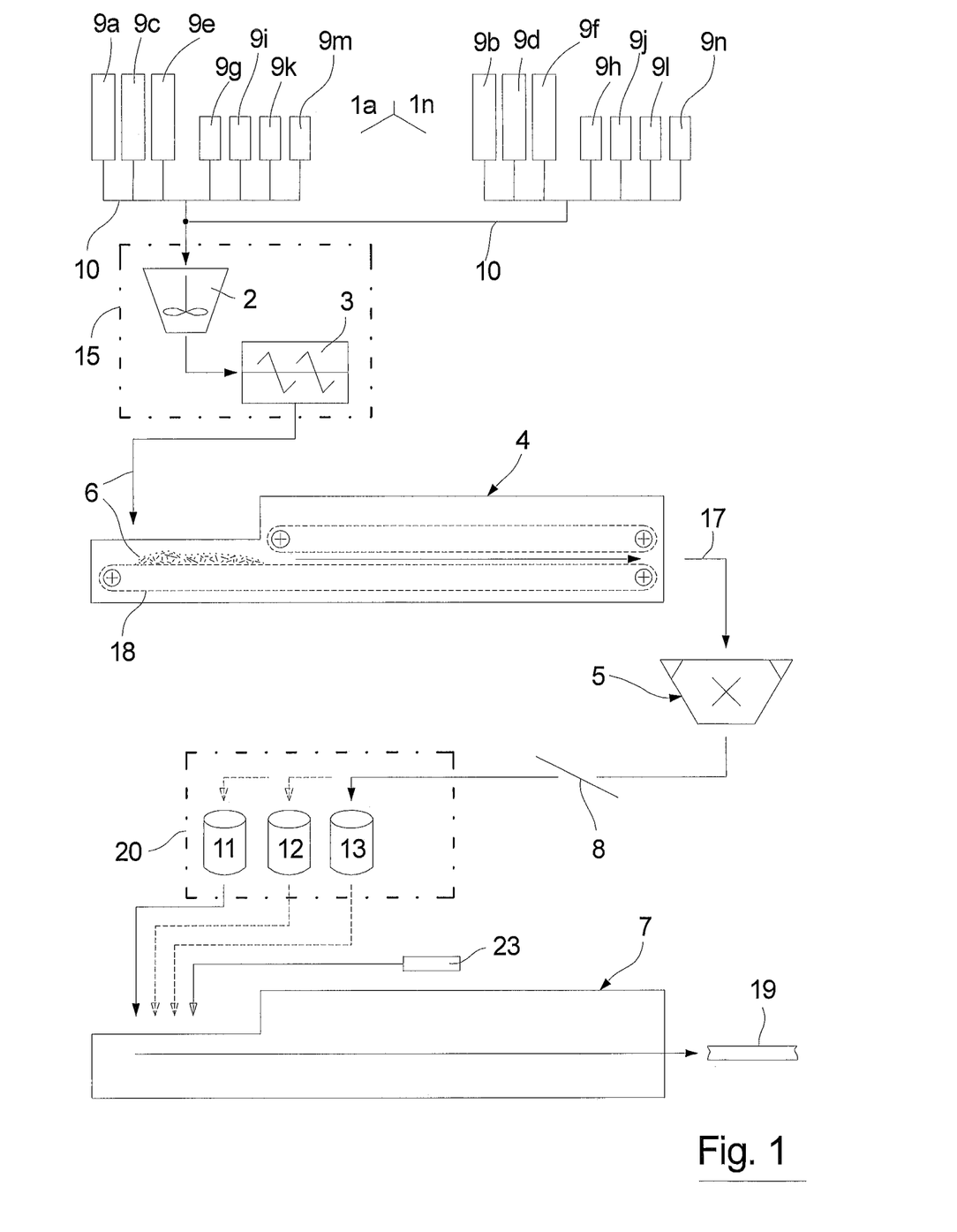
FIG. 1 a schematic representation of the process for manufacturing a thermoplastic granulate material according to the invention, as well as a new installation for the method.

The schematic representation in FIG. 1 shows that the starting materials 9 for the manufacture of a thermoplastic granulate material 11, 12 or 13 are housed in individual containers 1a . . . 1n. These starting materials 9 may for instance be different plastic powders 9a and 9b, different additives 9c and 9d, different plasticizers 9e and 9f, different color materials 9g and 9h, different lubricants 9i and 9j, different fillers 9k and 9l and/or different additives 9m and 9n. A starting material frequently used in practice for a plastic powder is PVC (polyvinylchloride), as well as other polymers.

Via a tubing system 10—for instance by means of integrated spiral conveyors –initially the starting materials selected from the starting materials 9a . . . 9n for a first type/species of thermoplastic granulate material, the first plastic powder 9a, the first additives 9c, the second plasticizer 9f, the first color material 9g, the first filler 9k and the second additive 9n are fed into a first mixer 2. Already at this point according to a first embodiment of the mixing the starting materials selected according to a first embodiment may be mixed in the ratio, such as necessary for the desired thermoplastic first granulate material 11.

But also according to a second embodiment of the mixing within the manufacturing process in the first mixer 2 there may be present only parts of the final composition.

The mixing within the first mixer 2 may be performed batch-wise—i.e. discontinually—or in a suitable first mixer 2 continually. The revolutions of the stirring blades of the first mixer 2 are selected so that the mixture of starting materials is heated to a desired temperature. From the first mixer 2, the heating mixer, the mixed starting materials are fed to a second mixer 3, the so-called cooling mixer.

At this point in practice the parts of the formulation that are still absent are added, e.g. a further filler, e.g. for assisting the cooling.

With respect to the first and the second mixers 2, 3 it should be noted that together they form a first heating/cooling mixer 15.

The mentioned course of action, i.e. the method step of filling the first mixer 2 until to the outputting of a pourable thermoplastic intermediate substrate 6, the powdery mixture out of the second mixer 3 has been adapted as a standard, since for instance the particles of the thermoplastic polymer are opened by the plasticizer in the best way. If this method step would be performed in one step, then inter alia the absorption of plasticizers or extenders into the particles of the thermoplastic polymer would be too much impeded.

During mixing of the starting materials in the second mixer 3—a friction or shearing heat is generated—also at very low feeding pressure—which is dissipated—if it exceeds a preset limit.

For instance only half of the intended amount of the fillers 9k and/or 9l is fed into the first mixer 2, and the second half of the intended amount of the fillers 9k and/or 9l is then fed into the second mixer 3. The second half of the amount of fillers is virtually a coolant at the same time.

The pourability of the thermoplastic intermediate substrate 6 produced in the heating/cooling mixer 15 within the scope of the invention is so important, since the latter substrate 6 after the heating/cooling mixer 15 shall be dispersed homogeneously onto the lower belt 18 of a double-belt press 4 by means of a known caster (not shown in the drawings).

The thermoplastic intermediate substrate 6, the mixed starting materials 9 which are provided onto the lower belt 18 of a double-belt press 4, lead to a particular type of granulate material—a first granulate material 11—which only later is mixed with granulate materials 12 and/or 13 of other types for producing in total a dotted or speckled or structured designed appearance of a thermoplastic web 19 to be made thereof.

The term "one species" within the scope of this invention however does not only mean "only a particular color" of a granulate material, but also a particular gloss or decorative effect. In addition also further physical characteristics, such as conductivity, flammability, density, particular shape, particulate distribution, etc. may determine a species or type.

Figure 4:
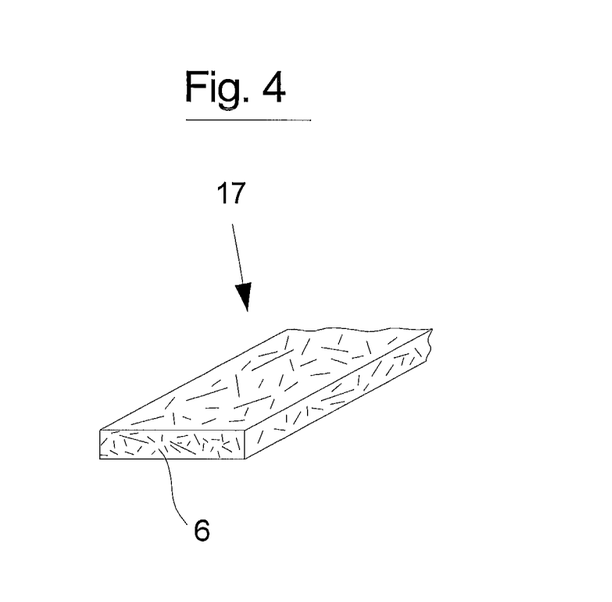
FIG. 4; a detail from FIG. 1.

The intermediate substrate dispersed onto the lower belt 18 of the double-belt press 4, in FIG. 1 here being the powdery mixture 6, in the further course of action within the double-belt press 4 within the gap formed between the two belts running around in the conveying direction depicted with an arrow, are treated thermally and mechanically, whereby an intermediate product, a dimensionally stable body 17, is generated which leaves the end of the double-belt press 4. This dimensionally stable body 17, see FIG. 4, finally in a further method step is processed to a thermoplastic granulate material 11. To this end a comminutor 5 is provided which in the embodiment shown in FIG. 1 preferably directly follows onto the double-belt press 4.

By selecting a suitable type of comminutor, e.g. one or more impact mills or one or more belt granulators or similar devices, the particulate size and the particulate distribution of the thermoplastic granulate material 11 to be produced can be determined arbitrarily and flexibly.

Also this feature is a decisive advantage when compared with the production method according to the prior art, wherein the extrusion method is used, since during the extrusion broad particulate size distributions or a fast and frequent change of the particulate size together with time-consuming configuration changes of the extruder and subsequent mixing steps of the generated granulate materials would result.

Thus, by the method according to the invention a homogeneous type of a granulate material, e.g. of one color together with an arbitrarily selectable particulate size distribution results which then may be fed to a granulate storage 20.

If later on a thermoplastic web 19 of a particular appearance shall be produced, then the necessary components 23 and the necessary intermediate products, are retrieved from the intermediate storage, here the granulate storage 20, possibly are mixed in desired ratios and are then fed to a double-belt press for producing the final product; in the embodiment according to FIG. 1 this is the second double-belt press 7.

The shape of the particle is determined by the press gap and by the selection and setting of the one or more comminutor(s).

It can be easily seen that by using the process according to the invention a particularly high increase in flexibility is obtained with respect to the thermoplastic granulate material and with respect to the final product.

DETAILED DESCRIPTION OF THE PREFERRED EMBODIMENTS

Figure 5:
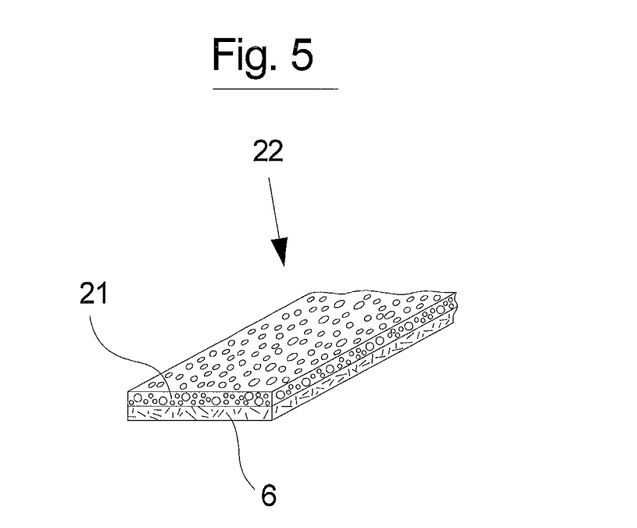
FIG. 5 a detail from FIG. 2.

A further embodiment of the method according to the invention is the production of multi-colored granulate materials. To this end, e.g. from several heating/cooling mixers 15 and 16 which produce pourable intermediate substrates 6, 21 of different colors in parallel, several layers of intermediate substrates 6, 21 are dispersed onto the lower belt 18 of the double-belt press (Thermofix installation) in alternating sequence by color or side by side, see FIGS. 2 and 3, and thereafter during running through the double-belt press 4 a planar formation having multiple layers or multiple colors in vertical and/or horizontal direction is generated as intermediate product, namely the dimensionally stable body 22, see also FIG. 5. Thereafter with the comminuting step 5, mentioned already above, preferably thereafter, there is produced the granulate material of multiple colors itself and having clearly distinct color surfaces.

Figure 6:
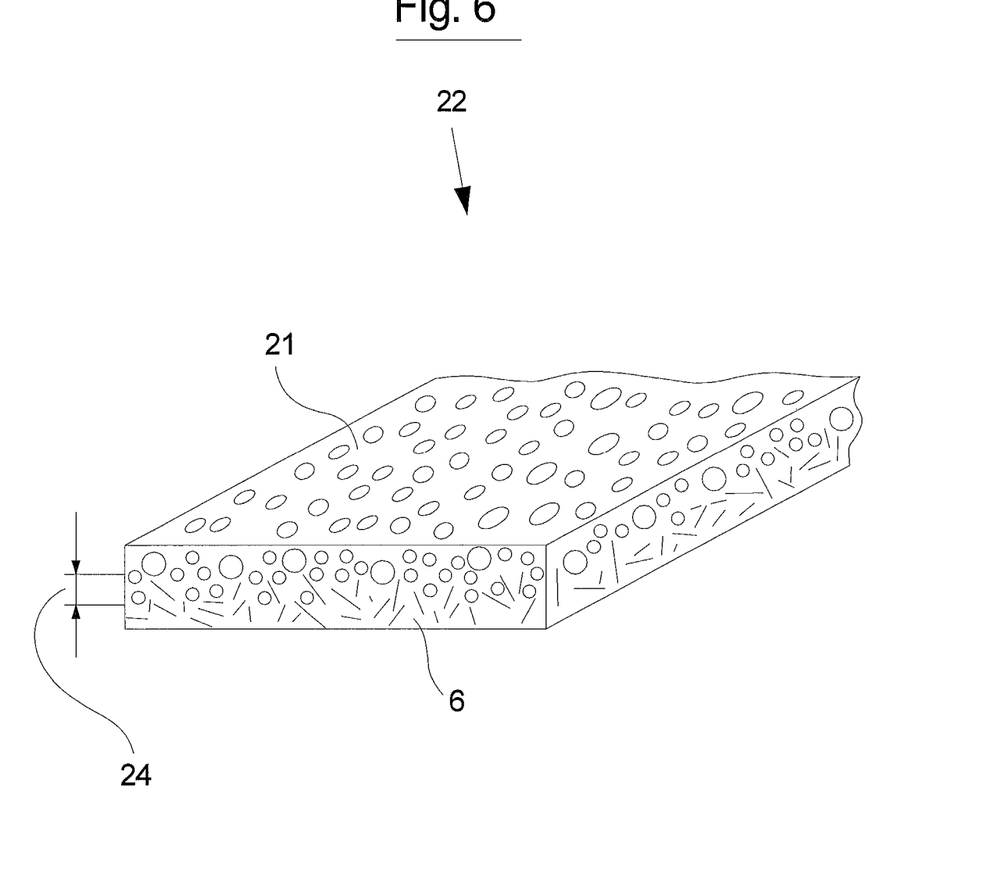
FIG. 6 a detail from FIG. 5.

According to a further embodiment of the method according to the invention also the thermoplastics granulate material may be produced not with clearly determined color boundaries, namely e.g. with blurred color boundaries, such as shown exemplarily in FIG. 6 with respect to the boundary 24. To this end before the thermal densification of the pourable intermediate substrate 6, 21 within the double-belt press 4 the laminar layer sequence of the dispersed layers in different colors are actively partially or almost totally destroyed in vertical and/or horizontal direction using mechanical measures, such as brush rollers or charging rakes or other suitable disturbing elements, thus generating color mixing effects within the planar formation that is generated, namely the dimensionally stable body 22. The granulate materials obtained therefrom then display very different color transitions within a single particle. By means of these particular granulates materials also in a final product, e.g. a thermoplastic web 19, novel design possibilities can be generated.

Figure 2:
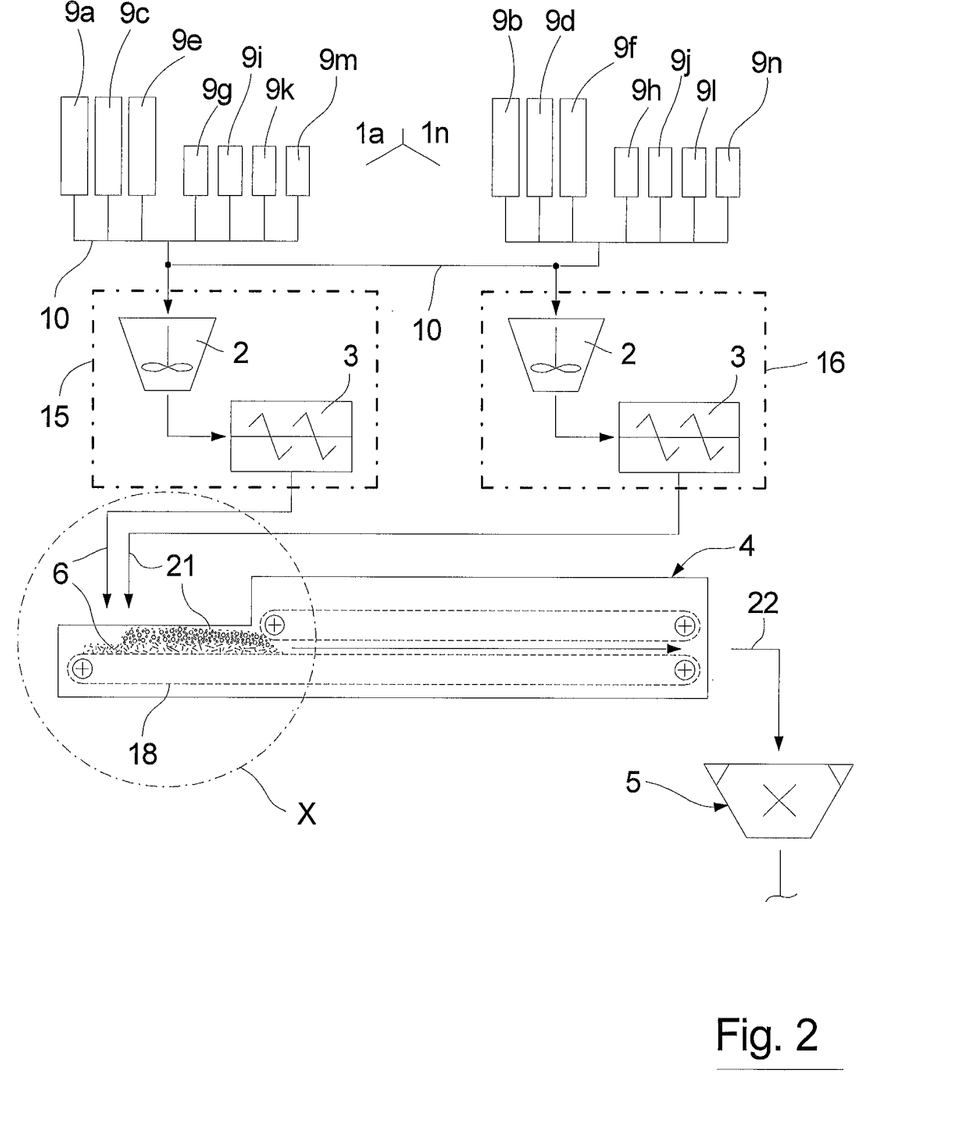
FIG. 2 a further variant of the new method according to FIG. 1 as well as the installation for performing the method.
Figure 3:
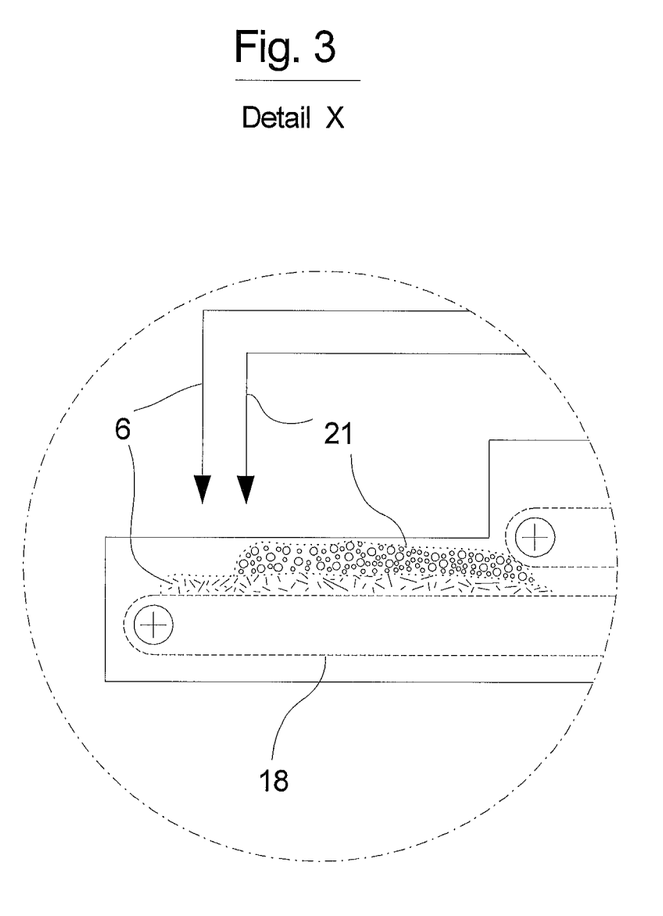
FIG. 3 a detail from FIG. 2.

According to a further embodiment of the method according to the invention the intermediate substrates disperse onto the lower belt 18 in one or more layers or gaps, respectively, the powdery mixtures 6 and 21, as well as also in the melting zone of the double-belt press 4, or only there, are shifted or mixed by means of disturbing elements once or several times with respect to their position with respect to each other. Such a disturbance within the melting zone in particular by the introduction of shear forces within suitable viscosity ranges leads to an improvement of the mechanical characteristics of the produced intermediate product, namely the dimensionally stable body 17 or 22, respectively, and thus finally of the granulate materials 11, 12 and/or 13.

According to the invention the disturbing elements are preferably measures for vibrating, brushing, spiking, plowing, kneading and similar mechanical interaction. These disturbing elements are arranged together with and in coordination with the upper belt of the double-belt press 4 or are arranged in combination with the latter.

Since during comminuting the web from the double-belt press 4 also a large amount of dust may be generated, it is preferred, if before the storage of the granulate material within the granulate storage 20 the granulate material is further sieved within a sieve device 8. The dust-shaped fine portions according to a further embodiment of the invention are fed back into the process, e.g. as fillers into the second mixer 3, e.g. when there shall be generated very dark color variants and thus the resultant color appearance is not impeded.

A further aspect of the invention rests in the fact that the final product 19 must not be produced on a separate, second double-belt press 7, but also using the first double-belt press 4 used for the production of the granulate material. In this case the production of the granulate material and the production of the final products are performed with shifted time sequentially on the one double-belt press. Such a double-belt press to this end comprises supplementary modules (e.g. caster or other process-related units), which are utilized selectively with respect to the desired process, namely either with respect to the production of granulate materials or with respect to the production of final products.

Another aspect of the invention according to a further embodiment of the novel method of producing the pourable intermediate substrate(s), again without the use of extruders, on a (first) double-belt press a patterned or a mono-colored web-shaped dimensionally stable body is produced, wherein this one or additional intermediate product(s) at the end of a double-belt press is not comminuted, but serves as a final web or only as a part thereof, in particular as an intermediate product for a web to be produced thereafter, which possibly may comprise further material coatings. According to a further aspect of the invention from the dimensionally stable bodies according to the invention any type of bodies may be produced as half-finished products or intermediate products by stamping, cutting, pressing or other suitable separating methods, to be used for producing a variety of products which may be close or more far off from the final products mentioned at the outset.

The dimensionally stable bodies, i.e. the first intermediate product and the further intermediate product(s) within the scope of this invention may also be film-shaped bodies in extreme embodiments.

It will be understood that afore-mentioned features of the invention may not only be used in the respectively given combination, but also in different combinations or independently, without leaving the scope of the invention.

REFERENCE NUMERAL LIST 1a, 1b ... 1n container (for pos. 9a, ... 9n)
2 first mixer (heating mixer)
3 second mixer (cooling mixer)
4 double-belt press (Thermofix press)
5 comminutor (chopper, mill or similar device)
6. intermediate substrate (powdery mixture, pourable)
7 further double-belt press (for final product)
8 sieve device
9 starting materials
9a first plastic powder
9b second plastic powder
9c first additives
9d second additives
9e first plasticizer
9f second plasticizer
9g first color materials
9h second color materials
9i first lubricant
9j second lubricant
9k first fillers
9l second fillers
9m first additives
9n second additives
10 tubing system
11 first granulate material
12 second granulate material
13 third granulate material
14 (not used)
15 first heating/cooling mixer
16 second heating/cooling mixer
17 first intermediate product (dimensionally stable body)
18 lower belt (of pos. 4)
19 thermoplastic web (final product)
20 granulate storage
21 further intermediate substrate (powdery mixture, pourable)
22 further intermediate product (dimensionally stable body)
23 component (for pos. 19)
24 boundary layer

The invention claimed is:

1. A method of producing a thermoplastic granulate material from several starting materials, comprising at least two materials selected form the group consisting of plastic powder, plastic granulate, additives, plasticizers, color materials, color pigments, lubricants, fillers, additives, and mixtures thereof, said method comprising the following steps:
    selecting starting materials and dosing said starting materials in a preselected mixing ratio;
    feeding said starting materials into at least one mixer;
    mixing said starting materials within at least one mixer while heating or and cooling a mixture produced therein yield a pourable intermediate substrate material
    dispersing said intermediate substrate material onto a press;
    treating said intermediate substrate material within said press thermally and mechanically to yield a thermoplastic web-shaped dimensionally stable body; and
    comminuting said thermoplastic web-shaped dimensionally stable body to yield a thermoplastic granulate material;
    wherein a plurality of different intermediate substrate materials are produced within said at least one mixer and differ at least with respect to one characteristic selected from the group consisting of color, mechanical characteristics, and chemical characteristics;
    wherein at least two different intermediate substrate materials are dispersed onto said press; and
    wherein said at least two different intermediate substrate materials are dispersed at least in two layers.

2. The method of claim 1, wherein said step of dispersing comprises dispersing said intermediate substrate material onto a lower belt of a double-belt press.

3. The method of claim 1, wherein said heating is performed within a first mixer and said cooling is performed in a second mixer.

4. The method of claim 1, wherein said heating and cooling is performed in a combined heating/cooling mixer.

5. The method of claim 1, wherein said different intermediate substrate materials are produced sequentially within a heating and a cooling mixer.

6. The method of claim 1, wherein said different intermediate substrate materials are produced in parallel within several heating and cooling mixers.

7. The method of claim 1, wherein a layer sequence of said different intermediate substrate materials dispersed onto said press is disturbed mechanically at least partially at least in vertical or horizontal direction before passing through a heating zone of said press.

8. The method of claim 7, wherein said step of mechanically disturbing said layer sequence comprises at least one action selected from the group consisting of vibrating, brushing, spiking, plowing, kneading.

9. The method of claim 1,
wherein said intermediate substrate material dispersed onto said press in one or more layers is subjected to shear forces during passing through a heating zone of said press.

10. The method of claim 7,
wherein said intermediate substrate material dispersed onto said press in one or more layers is subjected to shear forces during passing through a heating zone of said press.

11. The method of claim 1, wherein at least a first pourable intermediate substrate material is dispersed onto said press in one or more layers, is processed within said press and is subsequently comminuted to yield a first thermoplastic granulate material, and wherein a second pourable intermediate substrate material is dispersed onto said press in one or more layers, is processed within said press and is subsequently comminuted to yield a second thermoplastic granulate material differing from said first thermoplastic granulate material at least with respect to one characteristic selected from the group consisting of color, mechanical characteristics, and chemical characteristics, and being stored separately from said first thermoplastic granulate material.

12. The method of claim 1, wherein said step of comminuting is performed within a comminutor selected from the group consisting of a belt granulator, a punch, a mill and a chopper.

* * * * *

UNITED STATES PATENT AND TRADEMARK OFFICE
CERTIFICATE OF CORRECTION

PATENT NO. : 10,688,688 B2  
APPLICATION NO. : 15/542961  
DATED : June 23, 2020  
INVENTOR(S) : Voith et al.

Page 1 of 1

It is certified that error appears in the above-identified patent and that said Letters Patent is hereby corrected as shown below:

In the Claims

Column 8, Line 21 (Claim 1) change "form" to --from--.
Column 8, Line 30 (Claim 1) after "therein" insert --to--.
Column 8, Line 30 (Claim 1) after "material" insert --;--.

Signed and Sealed this
Twenty-eighth Day of July, 2020

Andrei Iancu
*Director of the United States Patent and Trademark Office*